United States Patent
Wilhelmsson

(10) Patent No.: US 10,448,426 B2
(45) Date of Patent: Oct. 15, 2019

(54) ENABLING TIME-OVERLAPPING COMMUNICATION USING CSMA/CA AND OFDMA

(71) Applicant: Telefonaktiebolaget LM Ericsson (publ), Stockholm (SE)

(72) Inventor: Leif Wilhelmsson, Dalby (SE)

(73) Assignee: TELEFONAKTIEBOLAGER LM ERICSSON (PUBL), Stockholm (SE)

( * ) Notice: Subject to any disclaimer, the term of this patent is extended or adjusted under 35 U.S.C. 154(b) by 15 days.

(21) Appl. No.: 15/735,231

(22) PCT Filed: Jun. 11, 2015

(86) PCT No.: PCT/EP2015/063039
§ 371 (c)(1),
(2) Date: Dec. 11, 2017

(87) PCT Pub. No.: WO2016/198107
PCT Pub. Date: Dec. 15, 2016

(65) Prior Publication Data
US 2018/0184458 A1     Jun. 28, 2018

(51) Int. Cl.
*H04W 74/08*      (2009.01)
*H04W 72/12*      (2009.01)
(Continued)

(52) U.S. Cl.
CPC ... *H04W 74/0816* (2013.01); *H04W 72/0453* (2013.01); *H04W 72/1215* (2013.01); *H04W 74/006* (2013.01); *H04W 74/02* (2013.01)

(58) Field of Classification Search
CPC ......... H04W 74/0816; H04W 72/0453; H04W 72/1215; H04W 74/006; H04W 74/02
See application file for complete search history.

(56) References Cited

U.S. PATENT DOCUMENTS

2009/0310692 A1\* 12/2009 Kafle .................... H04L 5/0007
                                                                                                        375/260
2011/0222486 A1    9/2011 Hart
(Continued)

FOREIGN PATENT DOCUMENTS

WO     2014110397 A1    7/2014
WO     2014179713 A1    11/2014

OTHER PUBLICATIONS

PCT International Search Report, dated Feb. 16, 2016, in connection with International Application No. PCT/EP2015/063039, all pages.
(Continued)

*Primary Examiner* — Afshawn M Towfighi
(74) *Attorney, Agent, or Firm* — Leffler Intellectual Property Law, PLLC

(57) ABSTRACT

A method for an access point of a wireless communication network is disclosed. The access point is adapted to use a communication channel resource to communicate with a plurality of first wireless communication devices using orthogonal frequency division multiple access (OFDMA) and to communicate with a plurality of second wireless communication devices using carrier sense multiple access with collision avoidance (CSMA/CA). The communication channel resource comprises a bandwidth of frequencies, the bandwidth of frequencies being dividable into a plurality of sub-carriers for OFDMA and a part of the bandwidth of frequencies forming a primary channel for CSMA/CA. The method comprises transmitting a downlink packet over all frequencies of the bandwidth for triggering one or more of the first wireless communication devices to perform OFDMA based uplink transmission. The downlink packet comprises an indication of an allocation of one or more sub-carriers to each of the triggered first wireless communication devices for the OFDMA based uplink transmission, and the allocated sub-carriers for OFDMA and the primary (Continued)

channel for CSMA/CA are non-overlapping. Corresponding computer program product, arrangement and access point are also disclosed.

24 Claims, 3 Drawing Sheets

(51) Int. Cl.
*H04W 74/00* (2009.01)
*H04W 72/04* (2009.01)
*H04W 74/02* (2009.01)

(56) References Cited

U.S. PATENT DOCUMENTS

| | | |
|---|---|---|
| 2013/0229996 A1 | 9/2013 | Wang et al. |
| 2014/0307612 A1 | 10/2014 | Vermani et al. |
| 2014/0328195 A1 | 11/2014 | Sampath et al. |
| 2014/0328235 A1 | 11/2014 | Merlin et al. |
| 2014/0328249 A1 | 11/2014 | Vermani et al. |
| 2015/0131517 A1* | 5/2015 | Chu ............. H04L 5/0007 370/312 |
| 2015/0139091 A1* | 5/2015 | Azizi ............ H04L 5/0035 370/329 |

OTHER PUBLICATIONS

PCT Written Opinion, dated Feb. 16, 2016, in connection with International Application No. PCT/EP2015/063039, all pages.

Hanqing Lou et al., Multi-User Parallel Channel Access for High Efficiency Carrier Grade Wireless LANs, 2014 IEEE International Conference on Communications (ICC), Jun. 10, 2014, pp. 3865-3870.

\* cited by examiner

ENABLING TIME-OVERLAPPING COMMUNICATION USING CSMA/CA AND OFDMA

TECHNICAL FIELD

The present invention relates generally to the field of wireless communication. More particularly, it relates to enabling of time-overlapping communication using CSMA/CA and communication using OFDMA.

BACKGROUND

Two important standards for wireless communication are UMTS-LTE (Universal Mobile Telecommunication Standard, Long Term Evolution) advocated by 3GPP (Third Generation Partnership Project) and Wi-Fi (IEEE 802.11 series) advocated by IEEE (Institute of Electrical and Electronics Engineers).

UMTS-LTE supports communication by orthogonal frequency division multiple access (OFDMA), while current versions of the IEEE 802.11 standards (e.g. 802.11g, 802.11n, 802.11ac) operate based on carrier sense multiple access with collision avoidance (CSMA/CA).

In the current versions of the IEEE 802.11 standards, the channel access is typically distributed among the nodes (access point—AP, stations—STA) using the distributed coordination function (DCF), which means that all nodes contend for the channel when they have data to send.

In the next generation of Wi-Fi, denoted HEW (High Efficiency WLAN—Wireless Local Area Network) or 802.11ax, OFDMA is introduced to improve the performance in dense deployments. Since there is a huge number of legacy Wi-Fi devices on the market (e.g. basing their operation on any of the standard versions 802.11g, 802.11n, 802.11ac), it is desirable that the introduction of OFDMA be made to allow support also for legacy devices.

It should be noted that similar situations may occur in other scenarios than those of IEEE 802.11.

Therefore, there is a need for methods and arrangements that provide coexistence of OFDMA and CSMA/CA.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

In the description herein, we will use the term OFDMA also for communication between the access point and only one of the first wireless communication devices, even if this may not be the strictly correct term in such a scenario. Typically, all OFDMA aspects and examples referred to herein are mostly applicable when the two or more of the one or more first wireless communication devices are involved in simultaneous communication with the access point.

It is an object of some embodiments to solve or mitigate at least some of the above or other disadvantages.

According to a first aspect, this is achieved by a method for an access point of a wireless communication network. The access point is adapted to use a communication channel resource to communicate with a plurality of first wireless communication devices using orthogonal frequency division multiple access (OFDMA) and to communicate with a plurality of second wireless communication devices using carrier sense multiple access with collision avoidance (CSMA/CA).

The communication channel resource comprises a bandwidth of frequencies. The bandwidth of frequencies is dividable into a plurality of sub-carriers for OFDMA and a part of the bandwidth of frequencies forms a primary channel for CSMA/CA.

The method comprises transmitting a downlink packet over all frequencies of the bandwidth for triggering one or more (or two or more) of the first wireless communication devices to perform OFDMA based uplink transmission. The downlink packet comprises an indication of an allocation of one or more sub-carriers to each of the triggered first wireless communication devices for the OFDMA based uplink transmission, and the allocated sub-carriers for OFDMA and the primary channel for CSMA/CA are non-overlapping.

For example, the first wireless communication devices may be devices operating in accordance with 802.11ax and the second wireless communication devices may be devices operating in accordance with any of 802.11g, 802.11n, and 802.11ac. In some situations, a wireless communication device may be both a first and second wireless communication device.

In some embodiments, the bandwidth of frequencies is dividable into the primary channel for CSMA/CA and one or more secondary channels for CSMA/CA.

In some embodiments, the downlink packet may further comprise an indication of the primary channel for the CSMA/CA based uplink transmission by the second wireless communication devices. In some embodiments, an indication of the primary channel for the CSMA/CA based uplink transmission may, alternatively or additionally, be communicated to the second wireless communication devices in another way (e.g. via broadcasting, beacon signaling, etc.).

According to some embodiments, the method may further comprise (before transmitting the downlink packet) using CSMA/CA to acquire access to the primary channel and the secondary channels comprised in the bandwidth of frequencies.

According to some embodiments, the method may further comprise allocating, to each of the first wireless communication devices to be triggered, the one or more sub-carriers for the OFDMA based uplink transmission.

In some embodiments, a percentage of the bandwidth used as allocated sub-carriers for OFDMA is based on a ratio of a number of first wireless communication devices associated with the access point to a sum of the number of first wireless communication devices associated with the access point and a number of second wireless communication devices associated with the access point.

In some embodiments, a percentage of the bandwidth used as allocated sub-carriers for OFDMA is based on a ratio of a traffic need for communication between the access point and the one or more first wireless communication devices to a total traffic need for communication between the access point and the first and second wireless communication devices.

The method may, according to some embodiments, further comprise causing a time duration between an end of the downlink packet and a start of the OFDMA based uplink transmission to be smaller than a time period threshold. The time period threshold may be smaller than or equal to a minimum time period required for any of the second wireless communication devices to acquire access to communication with the access point using CSMA/CA.

The minimum time period required for any of the second wireless communication devices to acquire access to communication with the access point using CSMA/CA may, for example, be equal to a length of a time period during which a node using CSMA/CA is to listen to the communication channel resource, and detecting inactivity thereon (i.e. detecting the channel as being free or idle), before using the communication channel resource for communication. Such a time period may, for example, equal a distributed coordination function (DCF) inter-frame space according to IEEE 802.11, or a DCF inter-frame space (DIFS) according to IEEE 802.11 plus a minimum value of a random time duration (RND) according to IEEE 802.11.

The value of the time period threshold may, for example, be equal to a short inter-frame space (SIFS) according to IEEE 802.11.

In some embodiments, the downlink packet comprises a control part extending over all frequencies of the bandwidth and comprising the indication of the allocation for the OFDMA based uplink transmission.

In some embodiments, the control part may further comprise one or more of: an indication of when the OFDMA based uplink transmission is to start, a timing adjustment command, a frequency adjustment command, and a transmission power level for the OFDMA based uplink transmission. Alternatively or additionally to the timing and/or frequency adjustment command, the control part may comprise other types of synchronization information (e.g. a synchronization signal).

The downlink packet may, according to some embodiments, further comprise a payload part with content directed to one or more of the plurality of first wireless communication devices. Typically, content directed to a particular one of the first wireless communication device may extend over one or more sub-carriers allocated to the particular first wireless communication device.

Alternatively or additionally, the downlink packet may, according to some embodiments, further comprise a payload part with content directed to one or more of the plurality of second wireless communication devices. Typically, content directed to a particular one of the second wireless communication device may extend over the primary channel for CSMA/CA.

In some embodiments, the method may further comprise receiving the OFDMA based uplink transmission from the triggered first wireless communication devices and receiving a CSMA/CA based uplink transmission from one of the second wireless communication devices, wherein the CSMA/CA based uplink transmission and the OFDMA based uplink transmission at least partly overlap in time.

If an end of the CSMA/CA based uplink transmission is later than an end of the OFDMA based uplink transmission, the method may further comprise delaying transmission of an acknowledgement message associated with the OFDMA based uplink transmission until after the end of the CSMA/CA based uplink transmission. In some embodiments, delaying transmission of the acknowledgement message associated with the OFDMA based uplink transmission is only done provided that a time interval between the end of the OFDMA based uplink transmission and the end of the CSMA/CA based uplink transmission is smaller than a maximum time interval. The method may, in some embodiments, further comprise transmitting a value of the maximum time interval to one or more of the first wireless communication devices. The value may, for example, be transmitted in the downlink packet (enabling the value to be dynamically adapted) or in a beacon signal (assuming a semi-static or static value).

If an end of the OFDMA based uplink transmission is later than an end of the CSMA/CA based uplink transmission and an acknowledgement message associated with the CSMA/CA based uplink transmission is due before the end of the OFDMA based uplink transmission, the method may further comprise either of: transmitting the acknowledgement message associated with the CSMA/CA based uplink transmission, and refraining from transmission of the acknowledgement message associated with the CSMA/CA based uplink transmission. Transmission of the acknowledgement message may, in some embodiments, be preceded by stopping the reception of the OFDMA based uplink transmission and, possibly, be followed by resumption of the reception of the OFDMA based uplink transmission. The method may, according to some embodiments, further comprise determining a first amount of data of the OFDMA based uplink transmission that will be corrupted by transmission of the acknowledgement message associated with the CSMA/CA based uplink transmission, determining a second amount of data of the CSMA/CA based uplink transmission to be acknowledged by the acknowledgement message associated with the CSMA/CA based uplink transmission, and selecting (based on the first and second amounts) whether to transmit the acknowledgement message associated with the CSMA/CA based uplink transmission or refrain from transmission of the acknowledgement message associated with the CSMA/CA based uplink transmission. For example, it may be selected to transmit the acknowledgement message associated with the CSMA/CA based uplink transmission if the second amount is larger than the first amount, and to refrain from transmission of the acknowledgement message associated with the CSMA/CA based uplink transmission otherwise.

The communication using OFDMA may, for example, be compliant with the IEEE 802.11ax standard and the communication using CSMA/CA may, for example, be compliant with any of the following standards: IEEE 802.11a, IEEE 802.11g, IEEE 802.11n and IEEE 802.11ac.

A second aspect is a computer program product comprising a computer readable medium, having thereon a computer program comprising program instructions. The computer program is loadable into a data-processing unit and adapted to cause execution of the method according to the first aspect when the computer program is run by the data-processing unit.

A third aspect is an arrangement for an access point of a wireless communication network. The access point is adapted to use a communication channel resource to communicate with a plurality of first wireless communication devices using orthogonal frequency division multiple access (OFDMA) and to communicate with a plurality of second wireless communication devices using carrier sense multiple access with collision avoidance (CSMA/CA).

The communication channel resource comprises a bandwidth of frequencies. The bandwidth of frequencies is dividable into a plurality of sub-carriers for OFDMA and a part of the bandwidth of frequencies forms a primary channel for CSMA/CA.

The arrangement comprises a controller adapted to cause the access point to transmit a downlink packet over all frequencies of the bandwidth for triggering one or more (or two or more) of the first wireless communication devices to perform OFDMA based uplink transmission. The downlink packet comprises an indication of an allocation of one or more sub-carriers to each of the triggered first wireless communication devices for the OFDMA based uplink transmission, and the allocated sub-carriers for OFDMA and the primary channel for CSMA/CA are non-overlapping.

In some embodiments, the arrangement may further comprise a transmitter adapted to transmit the downlink packet.

The controller may, according to some embodiments, be further adapted to cause the access point to receive the OFDMA based uplink transmission from the triggered first wireless communication devices and receive a CSMA/CA based uplink transmission from one of the second wireless communication devices, wherein the CSMA/CA based uplink transmission and the OFDMA based uplink transmission at least partly overlap in time.

In some embodiments, the arrangement may further comprise a receiver adapted to receive the OFDMA based uplink transmission and the CSMA/CA based uplink transmission.

A fourth aspect is an access point comprising the arrangement according to the third aspect.

In some embodiments, the third and fourth aspects may additionally have features identical with or corresponding to any of the various features as explained above for the first aspect.

An advantage of some embodiments is that coexistence of OFDMA and CSMA/CA is provided for. Particularly, wireless communication devices capable of CSMA/CA but not of OFDMA may communicate with the same access point as wireless communication devices capable of OFDMA in a controlled manner.

BRIEF DESCRIPTION OF THE DRAWINGS

Further objects, features and advantages will appear from the following detailed description of embodiments, with reference being made to the accompanying drawings, in which.

DETAILED DESCRIPTION

In the following, embodiments will be described where an access point is enabled to communicate with a plurality of first wireless communication devices using orthogonal frequency division multiple access (OFDMA) and to communicate with a plurality of second wireless communication devices using carrier sense multiple access with collision avoidance (CSMA/CA). This is enabled by using a bandwidth of frequencies dividable into a plurality of sub-carriers for OFDMA, wherein (at the same time) a part of the bandwidth of frequencies forms a primary channel for CSMA/CA.

Wi-Fi (IEEE 802.11) will be used herein as an illustrative example of a scenario when embodiments are particularly applicable. This is, however, not to be considered as limiting. Contrarily, embodiments are equally applicable to any scenario where OFDMA and CSMA/CA is to coexist using the same (or overlapping) frequency bandwidth.

Figure 1:
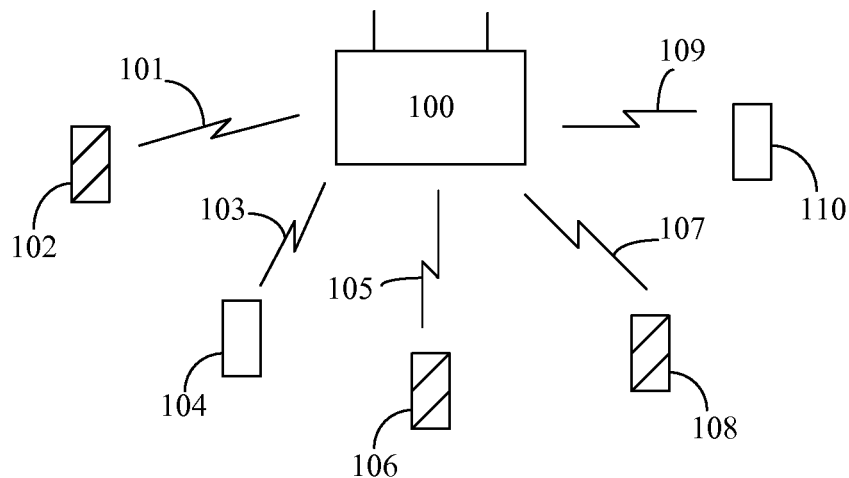
FIG. 1 is a schematic drawing illustrating an example scenario according to some embodiments.

FIG. 1 is a schematic illustration of an example scenario where some embodiments may be applicable. In this example scenario, an access point 100 is associated with a plurality of wireless communication devices 102, 104, 106, 108, 110 and communication between the access point and each of the wireless communication devices is enabled by radio links 101, 103, 105, 107, 109, respectively. The access point 100 may, for example, comprise arrangements and/or be adapted to perform methods according to any of the embodiments described herein.

In a typical example, the access point 100 is compliant with IEEE 802.11ax as well as earlier versions of the IEEE 802.11 standard (e.g. one or more of 802.11g, 802.11n, and 802.11ac), and some of the wireless communication devices (e.g. 102, 106, 108) are compliant with at least IEEE 802.11ax while the other wireless communication devices (e.g. 104, 110) are compliant only with earlier versions of the IEEE 802.11 standard (e.g. one or more of 802.11g, 802.11n, and 802.11ac) and not with IEEE 802.11ax.

Figure 2:
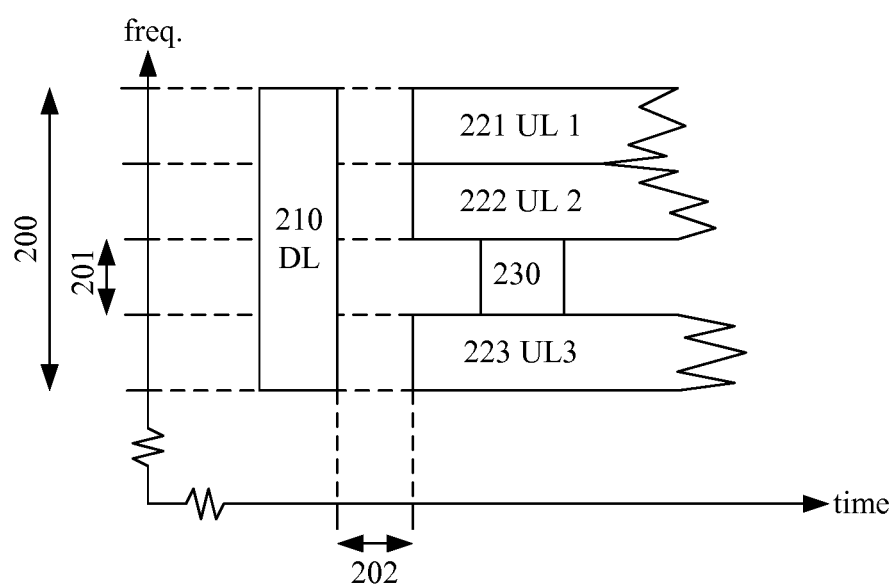
FIG. 2 is a schematic drawing illustrating an example packet structure according to some embodiments.

FIG. 2 illustrates an example packet structure in a time/frequency grid according to some embodiments, where a communication channel resource comprising a bandwidth 200 of frequencies is used by an access point to communicate with a plurality of first and second wireless communication devices using OFDMA and CSMA/CA, respectively.

The bandwidth of frequencies 200 is dividable into a plurality of sub-carriers for OFDMA. At the same time, the bandwidth of frequencies 200 comprises a primary channel 201 for CSMA/CA and possibly one or more secondary channels for CSMA/CA. The primary and secondary channels for CSMA/CA may, for example, be defined as in IEEE 802.11 standards. In some scenarios, all of the frequencies of the bandwidth 200 are generally available for CSMA/CA when not scheduled for OFDMA. In other scenarios, only some of the frequencies of the bandwidth 200 are generally available for CSMA/CA when not scheduled for OFDMA (i.e. there are frequencies within the bandwidth 200 only used for OFDMA). Furthermore, there may be frequencies outside of the bandwidth 200 generally available for CSMA/CA but not for OFDMA.

The packet structure of FIG. 2 is suitable for enabling time-overlapping communication using CSMA/CA and OFDMA.

The packet structure comprises a downlink packet (DL) 210 extending over all frequencies of the bandwidth 200. The downlink packet 210 is for triggering one or more (or two or more, in this case three) of the first wireless communication devices to perform OFDMA based uplink transmission.

For each of the triggered first wireless communication devices, one or more sub-carriers—which do not also belong to the primary channel 201 for CSMA/CA—are allocated for the OFDMA based uplink transmission, and the downlink packet comprises an indication of the allocation in a control part of the downlink packet 210.

The downlink packet 210 may also comprise a payload part with content directed to one or more of the plurality of first (and/or second) wireless communication devices.

The triggered first wireless communication devices are adapted to read the indication of their respective allocation and use OFDMA to transmit respective uplink packets (UL1, UL2, UL3) 221, 222, 223 according to the allocation. In the scenario of FIG. 2 the triggered first wireless communication devices have been allocated an equal amount of sub-carriers, but this does not have to be the case. In other scenarios, various ones of the triggered first wireless communication devices may be allocated differing amounts of sub-carriers.

Since the primary channel 201 is left unallocated with regard to OFDMA based uplink transmission, it may be used (during the OFDMA based uplink transmissions 221, 222, 223) for CSMA/CA based uplink transmission by the second wireless communication devices as illustrated by uplink transmission 230 in FIG. 2.

In FIG. 2 all frequencies of the bandwidth 200 that are not comprised in the primary channel 201 are allocated for OFDMA based uplink transmission. In other scenarios, more frequencies than those of the primary channel 201 may be left unallocated for OFDMA based uplink transmission, hence available for CSMA/CA based uplink transmission.

The percentage of the bandwidth 200 used as allocated sub-carriers for OFDMA may, for example, be based on how may of the wireless communication devices associated with the access point are OFDMA capable, an (estimated) traffic need of the OFDMA capable devices in relation to a total traffic need, or a combination thereof.

In a typical example (applicable to IEEE 802.11), the bandwidth 200 may be 80 MHz and be divided into four 20 MHz channels (one primary and three secondary) for CSMA/CA. In other examples, the bandwidth 200 may be 40, 80 or 160 MHz and be divided into channels for CSMA/CA of width 20, 40 or 80 MHz, as applicable.

CSMA/CA based communication may be avoided in frequency intervals allocated for OFDMA based communication by letting a time duration 202 between the end of the downlink packet 210 and the start of the OFDMA based uplink transmission 221, 222, 223 be smaller than a time period threshold, which (in turn) is smaller than or equal to a minimum time period required for any of the second wireless communication devices to acquire access to communication with the access point using CSMA/CA.

The downlink packet 210 may comprise an indication of when the OFDMA based uplink transmission is to start, or any other indication defining the time duration 202. Generally, the control of the relative timing between end of downlink packet 210 and start of uplink packet 221, 222, 223 may be implemented in any suitable way, for example, by explicit request from the access point, by indicated inter-frame space (IFS), by ending OFDMA transmission in the DL (implicit instruction to start uplink transmission), etc.

Generally, the OFDMA session may be upheld by letting a duration of uplink/downlink and downlink/uplink switching (the time period between end of uplink communication and start of downlink communication and time period between end of downlink communication and start of uplink communication, respectably) having a duration that is smaller than a minimum time period required for acquiring access to communication with the access point using CSMA/CA, thereby hindering CSMA/CA based communication in frequencies allocated for OFDMA based communication.

The minimum time period required for acquiring access to communication with the access point using CSMA/CA may, for example, be equal to a length of a time period during which a node using CSMA/CA is to listen to the communication channel resource, and detecting inactivity thereon (i.e. detecting the channel as being free or idle), before using the communication channel resource for communication. Such a time period may, for example, equal the DIFS according to IEEE 802.11, or DIFS plus a minimum value of a random time duration (RND).

As mentioned above, the value of the time period threshold should be smaller than the minimum time period required for acquiring access to communication with the access point using CSMA/CA. A possible value of the time period threshold that is smaller than DIFS is the short inter-frame space (SIFS) according to IEEE 802.11.

The downlink packet (e.g. 210 of FIG. 2) may be self-contained (similarly to the packet structure in 802.11n and 802.11ac) in that the packet may comprise information sufficient for complete processing. Specifically, the packet may comprise fields for time- and frequency synchronization, channel estimation, control data (e.g. describing what modulation and coding scheme are used for the content; data, ack/nak, etc.), and packet length. There are typically no restrictions on the actual content, but the data may, for example, be formatted in a similar way as is currently is done in IEEE 802.11 standards. Before a wireless communication device can decode its packet it may typically perform synchronization, channel estimation, read out the format of the packet, and determine that the packet is directed to itself by reading out the addresses.

A typical downlink packet structure (e.g. 210 of FIG. 2) may have a first part being a legacy preamble. The legacy preamble may have the same frequency width as the CSMA/CA based communication and may be repeated over the full bandwidth 200.

A second part of the typical downlink packet structure may comprise High-Efficiency Signal (HE-SIG) field(s) at least on the frequencies intended for OFDMA. The HE-SIG field(s) may, for instance, comprise information about what sub-carriers are allocated to which first wireless communication device for the payload part of the downlink packet.

The second part of the typical downlink packet structure may also comprise Legacy Signal (SIG) field(s) on the frequencies intended for CSMA/CA.

A typical uplink packet structure (e.g. 221, 222, 223 of FIG. 2) may have a first part being a legacy preamble, which can be demodulated also by legacy devices. The content of the legacy preamble may, for instance, comprise signals suitable for synchronization, frequency estimation, AGC adjustment, channel estimation, and information which can be used to determine the duration of the packet (e.g. modulation and coding scheme (MCS) and data amount).

A second part of the typical uplink packet structure may comprise High-Efficiency Signal (HE-SIG) field(s). The HE-SIG field(s) may, for instance, comprise information about what coding is used, and other transmission parameters.

A third part of the typical uplink packet structure may comprise a HE short training field (HE-STF), which may be used for re-synchronization, etc.

A fourth part of the typical uplink packet structure may comprise a HE long training field (HE-LTF), which may be used for channel estimation (which is typically used for demodulation and to be able to cancel interfering streams in case of MIMO).

A fifth part of the typical uplink packet structure may comprise the actual payload. The uplink packet may contain uplink data and/or acknowledgement (ACK) or negative ACK for an earlier uplink transmission.

Figure 3:
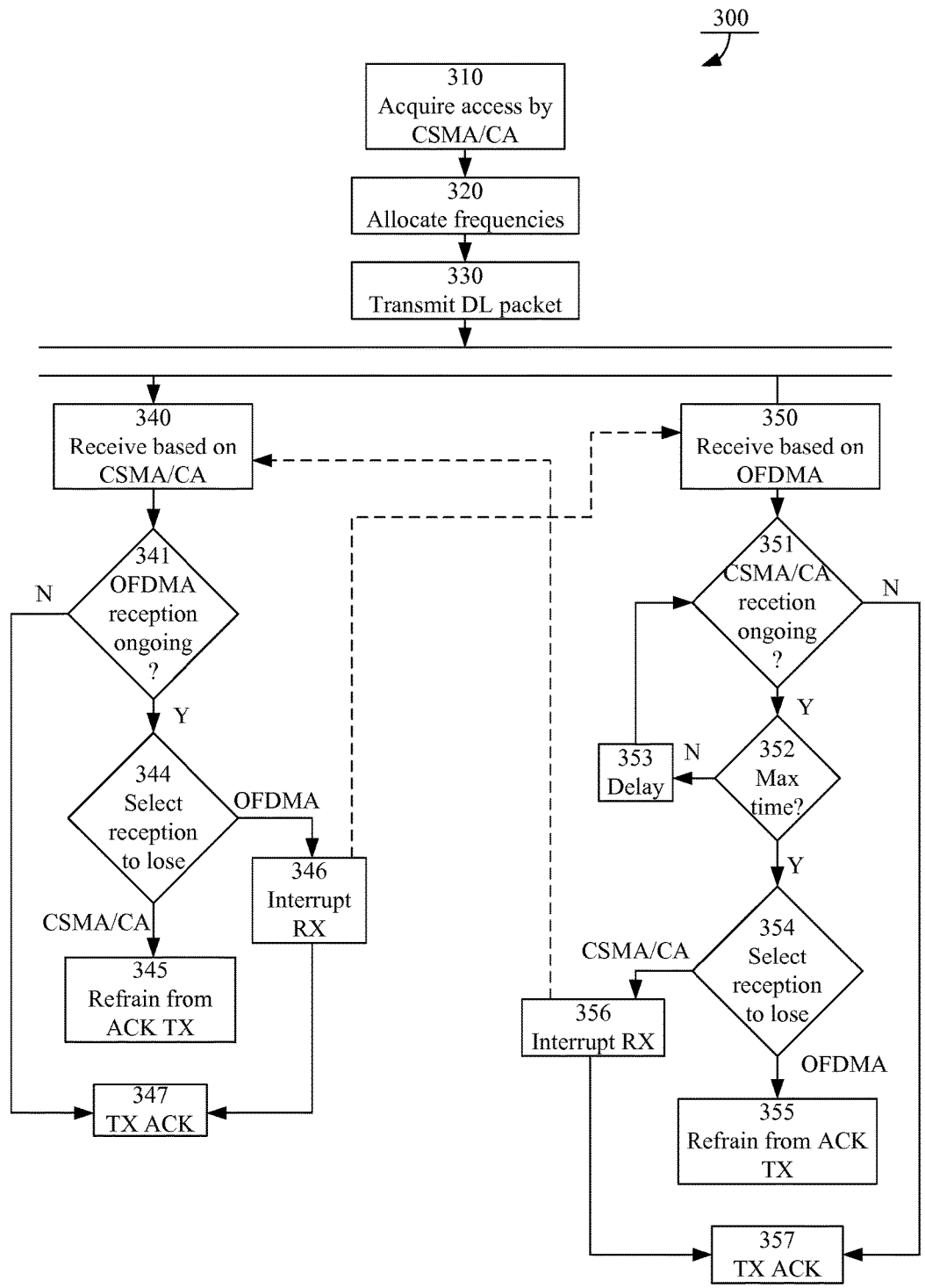
FIG. 3 is a flowchart illustrating example method steps according to some embodiments.

FIG. 3 illustrates an example method 300 for an access point of a wireless communication network according to some embodiments.

The access point performing the method 300 (e.g. the access point 100 of FIG. 1) is adapted to use a communication channel resource to communicate with a plurality of first wireless communication devices using OFDMA and to communicate with a plurality of second wireless communication devices using CSMA/CA. The communication channel resource comprises a bandwidth of frequencies (e.g. the bandwidth 200 of FIG. 2) dividable into a plurality of sub-carriers for OFDMA and comprising a primary channel (and possibly one or more secondary channels) for CSMA/CA.

The method 300 starts in step 310 where access is acquired, using CSMA/CA, to the primary channel and the secondary channels comprised in the bandwidth of frequencies.

In step 320, one or more sub-carriers are allocated to each of a number (one, two, three or more) of the first wireless communication devices for OFDMA based uplink transmission. The allocation is performed such that the allocated sub-carriers for OFDMA and the primary channel for CSMA/CA are non-overlapping.

As mentioned before the percentage of the bandwidth used as allocated sub-carriers for OFDMA may be based on various parameters (e.g. portion of OFDMA capable devices, OFDMA traffic need, etc.).

A downlink packet (compare with downlink packet 210 of FIG. 2) is transmitted in step 330. The downlink packet may typically extend over all frequencies of the bandwidth usable for OFDMA based communication.

As described in connection with FIG. 2, the downlink packet is for triggering the relevant first wireless communication devices to perform OFDMA based uplink transmission. To this end the downlink packet comprises an indication of the sub-carrier allocation. The downlink packet may also comprise an indication of when the OFDMA based uplink transmission should start, and possibly other control information (e.g. synchronization information, power control information, etc.).

Typically, the indication of when the OFDMA based uplink transmission should start is designed to prevent CSMA/CA based uplink transmission to be initiated on the frequencies allocated for OFDMA based uplink transmission by causing a time duration between an end of the downlink packet and a start of the OFDMA based uplink transmission to be smaller than a time period threshold, which is in turn smaller than or equal to a minimum time period required for any of the second wireless communication devices to acquire access to communication with the access point using CSMA/CA. A similar approach may be used when switching from OFDMA uplink communication to OFDMA downlink communication.

After step 330, the access point receives the OFDMA based uplink transmission (compare with 221, 222, 223 of FIG. 2) from the triggered first wireless communication devices according to the allocation as illustrated by step 350. In parallel, concurrently, or at least partly overlapping in time, the access point may receive CSMA/CA based uplink transmission on the primary channel (compare with 230 of FIG. 2) from one (or more—one after the other) second wireless communication devices as illustrated by step 340.

The example method 300 also illustrates various approaches that may be applied when an acknowledgement message associated with receipt of an uplink packet is to be transmitted by the access point.

Starting with the case where an acknowledgement message associated with receipt of a CSMA/CA based uplink packet is to be transmitted, it is checked in step 341 whether the access point is engaged in an ongoing reception of OFDMA based uplink transmission (i.e. whether step 350 is currently being executed).

If there is no ongoing OFDMA reception (N-path out from step 341), the acknowledgement message is transmitted in step 347.

If there is ongoing OFDMA reception (Y-path out from step 341), the access points decides (in step 344) whether or not to transmit the acknowledgement message according to a suitable selection criterion.

The decision of step 344 relates to whether to lose the data of OFDMA based or CSMA/CA based uplink reception.

If it is decided to refrain from transmission of the acknowledgement message (CSMA/CA-path out of step 344, ending in step 345), the received CSMA/CA uplink packet will be retransmitted (the earlier transmission of it effectively lost).

On the other hand, if it is decided to transmit the acknowledgement message (OFDMA-path out of step 344, ending in step 347), the ongoing OFDMA reception will be corrupted whether or not the reception is interrupted during the transmission of the acknowledgement as illustrated by step 346. Thus, some information of the OFDMA uplink transmission will be lost. In some cases (e.g. if redundancy coding is used) this may be possible to restore without retransmission of the uplink packet(s). In other cases, the received OFDMA uplink packet(s) will need to be retransmitted.

The selection criterion applied in step 344 may comprise selecting to lose the least amount of data, cause the least amount of retransmissions, or similar. For example, if the length of the CSMA/CA based uplink packet is smaller than the accumulated lengths of the OFDMA based uplink packets of the ongoing reception, it may be determined to refrain from transmission of the acknowledgement message, and vice versa. Numerous other relations between the length of the CSMA/CA based uplink packet and the length of the OFDMA based uplink packet(s) may be applied as suitable.

Turning to the case where an acknowledgement message associated with receipt of an OFDMA based uplink packet is to be transmitted, it is checked in step 351 whether the access point is engaged in an ongoing reception of CSMA/CA based uplink transmission (i.e. whether step 340 is currently being executed).

If there is no ongoing CSMA/CA reception (N-path out from step 351), the acknowledgement message is transmitted in step 357.

If there is ongoing CSMA/CA reception (Y-path out from step 351), the access point may delay (step 353) the transmission of the acknowledgement message (step 357) until the CSMA/CA reception has ended.

The delay may typically not be longer than a maximum time interval, which is controlled by step 352. The value of the maximum time interval may, typically, be indicated to the first wireless communication devices in some manner (e.g. via the downlink packet of step 330, via beacon signaling, or otherwise).

Hence, as long as the maximum time interval has not elapsed (N-path out from step 352), the process continues to step 353 where the transmission of the acknowledgement message is delayed while the process monitors the ongoing CSMA/CA reception in step 351 and transmits the acknowledgement message in step 357 if it is detected that the ongoing CSMA/CA reception has ended (N-path out from step 351).

However, if the CSMA/CA reception has not ended when the maximum time interval has elapsed (Y-path out from step 352), the method proceeds to step 354 where the access points decides whether or not to transmit the acknowledgement message according to a suitable selection criterion.

The decision of step 354 relates to whether to lose the data of OFDMA based or CSMA/CA based uplink reception and is similar to the decision of step 344 as described above.

If it is decided to refrain from transmission of the acknowledgement message (OFDMA-path out of step 354, ending in step 355), the received OFDMA uplink packet will be retransmitted (the earlier transmission of it effectively lost).

On the other hand, if it is decided to transmit the acknowledgement message (CSMA/CA-path out of step 354, ending in step 357), the ongoing CSMA/CA reception will be corrupted whether or not the reception is interrupted during the transmission of the acknowledgement as illustrated by step 356. Thus, some information of the CSMA/CA uplink transmission will be lost. In some cases (e.g. if redundancy coding is used) this may be possible to restore without retransmission of the uplink packet. In other cases, the received CSMA/CA uplink packet will need to be retransmitted.

Steps 351, 352, 353 and 354 are illustrated in FIG. 3 as being performed after the OFDMA reception is ended and while the CSMA/CA reception is potentially ongoing (i.e. continuously monitoring the CSMA/CA reception between the end of OFDMA reception until either of steps 355 and 357 is reached). In some (possibly more practical) embodiments, knowledge regarding how long CSMA/CA reception will go on after OFDMA reception has ended (compare with steps 351, 352, 353) may be obtained already at the start of the parallel reception of the OFDMA and CSMA/CA packets by explicit signaling of the respective packet lengths from the respective wireless communication devices transmitting the packets. A decision regarding whether to lose the data of OFDMA based or CSMA/CA based uplink reception (compare with step 354) can also be made at the start of the parallel reception.

Similarly, steps 341 and 344 are illustrated in FIG. 3 as being performed after the CSMA/CA reception is ended and while the OFDMA reception is potentially ongoing. In some embodiments, knowledge regarding how long OFDMA reception will go on after CSMA/CA reception has ended (compare with step 341) may be obtained already at the start of the parallel reception of the OFDMA and CSMA/CA packets by explicit signaling of the respective packet lengths from the respective wireless communication devices transmitting the packets. A decision regarding whether to lose the data of OFDMA based or CSMA/CA based uplink reception (compare with step 344) can also be made at the start of the parallel reception.

Of course, numerous variations may be envisioned of the approaches to acknowledgement message transmission described above. For example: steps 346 and/or 356 may be omitted and reception continue during the transmission of the acknowledgement message in steps 347 and 357, respectively; steps 341-347 may be applied without applying steps 351-357 or vice versa; steps 351, 352 and 353 may be omitted; etc.

Figure 4:
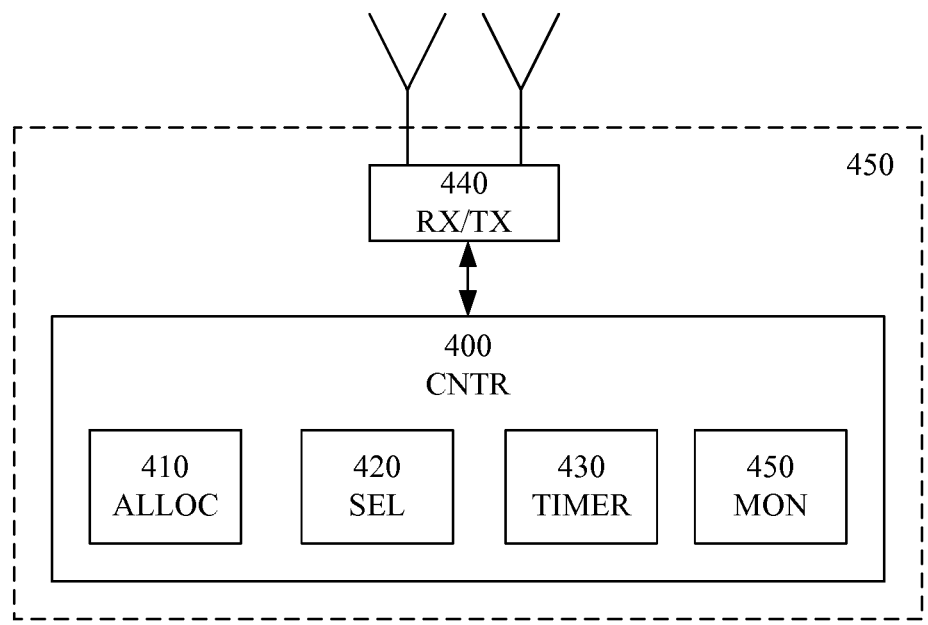
FIG. 4 is a block diagram illustrating an example arrangement according to some embodiments.

FIG. 4 illustrates an example arrangement 450 for an access point of a wireless communication network according to some embodiments. The arrangement 450 may for example be comprised in the access point 100 of FIG. 1 and/or may be adapted to perform the method of FIG. 3.

The arrangement 450 is for an access point adapted to use a communication channel resource to communicate with a plurality of first wireless communication devices using OFDMA and to communicate with a plurality of second wireless communication devices using CSMA/CA. The communication channel resource comprises a bandwidth of frequencies (e.g. the bandwidth 200 of FIG. 2) dividable into a plurality of sub-carriers for OFDMA and comprising a primary channel (and possibly one or more secondary channels) for CSMA/CA.

The arrangement 450 comprises a controller (CNTR) 400 and may also comprise a transmitter and a receiver (illustrated as a transceiver (RX/TX) 440).

The controller 400 may be adapted to cause the access point to acquire access to the communication resource using CSMA/CA (compare with step 310 of FIG. 3).

The controller 400 may, alternatively or additionally, be adapted to allocate sub-carriers to one, two, three or more of the first wireless communication devices (compare with step 320 of FIG. 3). To this end, the controller 400 may comprise an allocator (ALLOC) 410, e.g. a scheduler. In some embodiments, the allocator may be located outside of the controller 400 but still in the access point or outside the access point.

The controller 400 is adapted to cause the access point to transmit (by the transmitter 440) a downlink packet over all frequencies of the bandwidth for triggering the one, two, three or more first wireless communication devices to perform OFDMA based uplink transmission (compare with step 330 of FIG. 3 and 210 of FIG. 2). The downlink packet comprises an indication of the sub-carrier allocation for OFDMA, which allocation is non-overlapping with the primary channel for CSMA/CA.

The controller 400 may also be adapted to cause the access point to receive (by the receiver 440) the OFDMA based uplink transmission from the triggered first wireless communication devices and a CSMA/CA based uplink transmission from one of the second wireless communication devices, wherein the CSMA/CA based uplink transmission and the OFDMA based uplink transmission at least partly overlap in time (compare with steps 340 and 350 of FIG. 3).

When an acknowledgement message of any of the received uplink packets is to be transmitted, the controller 400 may be adapted to follow any of the approaches described in connection to FIG. 3. To this end, the controller 400 may comprise various functional modules corresponding to the various steps described in connection to FIG. 3 (e.g. a monitor (MON) 450 adapted to monitor the reception by the receiver 440 according to any or both of steps 341 and 351, a selector (SEL) 420 adapted to perform any or both of steps 344 and 354, one or more timers (TIMER) 430 adapted to proved basis for the determination of step 352 and the delay of step 353, etc.).

It should be noted that, generally, the first wireless communication devices may be notified that part of the bandwidth 200 may be used for non-OFDMA (CSMA/CA) communication. Such notification may, for example, be signaled in a beacon signal or may be made explicit for a specific transmission (e.g. signaled in the downlink packet).

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as an access point or network node) comprising circuitry/logic or performing methods according to any of the embodiments.

Figure 5:
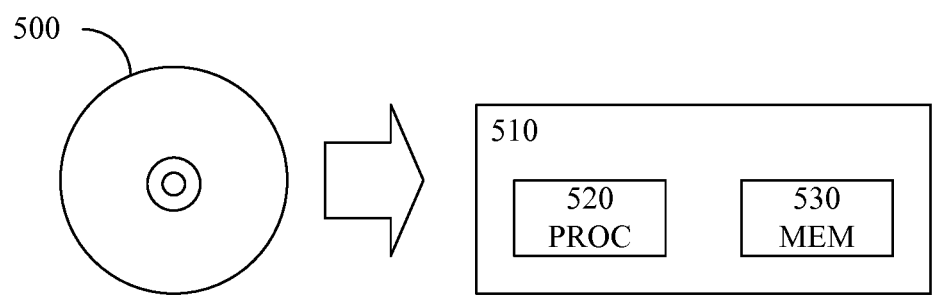
FIG. 5 is a schematic drawing illustrating a computer readable medium according to some embodiments.

According to some embodiments, a computer program product comprises a computer readable medium such as, for example, a USB-stick, a plug-in card, an embedded drive, or a CD-ROM (such as the CD-ROM 500 illustrated in FIG. 5). The computer readable medium may have stored thereon a computer program comprising program instructions. The computer program may be loadable into a data-processing unit (PROC) 520, which may, for example, be comprised in an access point 510. When loaded into the data-processing unit, the computer program may be stored in a memory (MEM) 530 associated with or integral to the data-processing unit. According to some embodiments, the computer program may, when loaded into and run by the data-processing unit, cause the data-processing unit to execute method steps according to, for example, the methods described above.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A method for an access point of a wireless communication network, wherein the access point is adapted to use a communication channel resource to communicate with a plurality of first wireless communication devices using orthogonal frequency division multiple access OFDMA and to communicate with a plurality of second wireless communication devices using carrier sense multiple access with collision avoidance—CSMA/CA, wherein the communication channel resource comprises a bandwidth of frequencies, the bandwidth of frequencies being dividable into a plurality of sub-carriers for OFDMA and a part of the bandwidth of frequencies forming a primary channel for CSMA/CA, the method comprising:

transmitting a downlink packet over all frequencies of the bandwidth for triggering one or more of the first wireless communication devices to perform OFDMA based uplink transmission, wherein the downlink packet comprises an indication of an allocation of one or more sub-carriers to each of the triggered first wireless communication devices for the OFDMA based uplink transmission, the allocated sub-carriers for OFDMA and the primary channel for CSMA/CA being non-overlapping;

receiving the OFDMA based uplink transmission from the triggered first wireless communication devices; and receiving a CSMA/CA based uplink transmission from one of the second wireless communication devices, wherein the CSMA/CA based uplink transmission and the OFDMA based uplink transmission at least partly overlap in time, wherein, if an end of the CSMA/CA based uplink transmission is later than an end of the OFDMA based uplink transmission, the method further comprises:

delaying transmission of an acknowledgement message associated with the OFDMA based uplink transmission until after the end of the CSMA/CA based uplink transmission.

2. The method of claim 1 wherein a percentage of the bandwidth used as allocated sub-carriers for OFDMA is based on a ratio of a number of first wireless communication devices associated with the access point to a sum of the number of first wireless communication devices associated with the access point and a number of second wireless communication devices associated with the access point.

3. The method of claim 1 wherein a percentage of the bandwidth used as allocated sub-carriers for OFDMA is based on a ratio of a traffic need for communication between the access point and the one or more first wireless communication devices to a total traffic need for communication between the access point and the first and second wireless communication devices.

4. The method of claim 1, further comprising causing a time duration between an end of the downlink packet and a start of the OFDMA based uplink transmission to be smaller than a time period threshold, wherein the time period threshold is smaller than or equal to a minimum time period required for any of the second wireless communication devices to acquire access to communication with the access point using CSMA/CA.

5. The method according to claim 1, wherein the downlink packet comprises a control part extending over all frequencies of the bandwidth and comprising the indication of the allocation for the OFDMA based uplink transmission and one or more of:

an indication of when the OFDMA based uplink transmission is to start;

a timing adjustment command;

a frequency adjustment command; and a transmission power level for the OFDMA based uplink transmission.

6. The method according to claim 5 wherein the downlink packet further comprises a payload part with content directed to one or more of the plurality of first wireless communication devices, wherein content directed to a particular one of the first wireless communication device extends over one or more sub-carriers allocated to the particular first wireless communication device.

7. The method of 1, wherein, if an end of the OFDMA based uplink transmission is later than an end of the CSMA/CA based uplink transmission and an acknowledgement message associated with the CSMA/CA based uplink transmission is due before the end of the OFDMA based uplink transmission, the method further comprises either of:

transmitting the acknowledgement message associated with the CSMA/CA based uplink transmission; and refraining from transmission of the acknowledgement message associated with the CSMA/CA based uplink transmission.

8. The method of claim 7 further comprising:
determining a first amount of data of the OFDMA based uplink transmission that will be corrupted by transmission of the acknowledgement message associated with the CSMA/CA based uplink transmission;
determining a second amount of data of the CSMA/CA based uplink transmission to be acknowledged by the acknowledgement message associated with the CSMA/CA based uplink transmission; and
selecting, based on the first and second amounts, whether to transmit the acknowledgement message associated with the CSMA/CA based uplink transmission or refrain from transmission of the acknowledgement message associated with the CSMA/CA based uplink transmission.

9. The method of claim 1, wherein the communication using OFDMA is compliant with the IEEE 802.11ax standard and the communication using CSMA/CA is compliant with any of the following standards: IEEE 802.11a, IEEE 802.11g, IEEE 802.11n and IEEE 802.11ac.

10. A method for an access point of a wireless communication network, wherein the access point is adapted to use a communication channel resource to communicate with a plurality of first wireless communication devices using orthogonal frequency division multiple access—OFDMA—and to communicate with a plurality of second wireless communication devices using carrier sense multiple access with collision avoidance—CSMA/CA,
wherein the communication channel resource comprises a bandwidth of frequencies, the bandwidth of frequencies being dividable into a plurality of sub-carriers for OFDMA and a part of the bandwidth of frequencies forming a primary channel for CSMA/CA,
the method comprising:
transmitting a downlink packet over all frequencies of the bandwidth for triggering one or more of the first wireless communication devices to perform OFDMA based uplink transmission, wherein the downlink packet comprises an indication of an allocation of one or more sub-carriers to each of the triggered first wireless communication devices for the OFDMA based uplink transmission, the allocated sub-carriers for OFDMA and the primary channel for CSMA/CA being non-overlapping;
receiving the OFDMA based uplink transmission from the triggered first wireless communication devices; and
receiving a CSMA/CA based uplink transmission from one of the second wireless communication devices,
wherein the CSMA/CA based uplink transmission and the OFDMA based uplink transmission at least partly overlap in time,
wherein, if an end of the CSMA/CA based uplink transmission is later than an end of the OFDMA based uplink transmission, the method further comprises:
delaying transmission of an acknowledgement message associated with the OFDMA based uplink transmission until after the end of the CSMA/CA based uplink transmission provided that a time interval between the end of the OFDMA based uplink transmission and the end of the CSMA/CA based uplink transmission is smaller than a maximum time interval.

11. The method of claim 10 further comprising transmitting a value of the maximum time interval to one or more of the first wireless communication devices.

12. A nontransitory computer readable medium, having thereon a computer program comprising program instructions, the computer program being loadable into a data-processing unit and adapted to cause execution of a method when the computer program is run by the data-processing unit, wherein the method is for an access point of a wireless communication network, wherein the access point is adapted to use a communication channel resource to communicate with a plurality of first wireless communication devices using orthogonal frequency division multiple access—OFDMA—and to communicate with a plurality of second wireless communication devices using carrier sense multiple access with collision avoidance—CSMA/CA,
wherein the communication channel resource comprises a bandwidth of frequencies, the bandwidth of frequencies being dividable into a plurality of sub-carriers for OFDMA and a part of the bandwidth of frequencies forming a primary channel for CSMA/CA,
the method comprising:
transmitting a downlink packet over all frequencies of the bandwidth for triggering one or more of the first wireless communication devices to perform OFDMA based uplink transmission, wherein the downlink packet comprises an indication of an allocation of one or more sub-carriers to each of the triggered first wireless communication devices for the OFDMA based uplink transmission, the allocated sub-carriers for OFDMA and the primary channel for CSMA/CA being non-overlapping;
receiving the OFDMA based uplink transmission from the triggered first wireless communication devices; and
receiving a CSMA/CA based uplink transmission from one of the second wireless communication devices,
wherein the CSMA/CA based uplink transmission and the OFDMA based uplink transmission at least partly overlap in time,
wherein, if an end of the CSMA/CA based uplink transmission is later than an end of the OFDMA based uplink transmission, the method further comprises:
delaying transmission of an acknowledgement message associated with the OFDMA based uplink transmission until after the end of the CSMA/CA based uplink transmission.

13. An arrangement for an access point of a wireless communication network, wherein the access point is adapted to use a communication channel resource to communicate with a plurality of first wireless communication devices using orthogonal frequency division multiple access—OFDMA—and to communicate with a plurality of second wireless communication devices using carrier sense multiple access with collision avoidance—CSMA/CA,
wherein the communication channel resource comprises a bandwidth of frequencies, the bandwidth of frequencies being dividable into a plurality of sub-carriers for OFDMA and part of the bandwidth of frequencies forming a primary channel for CSMA/CA, the arrangement comprising a controller adapted to cause the access point to:
transmit a downlink packet over all frequencies of the bandwidth for triggering one or more of the first wireless communication devices to perform OFDMA based uplink transmission, wherein the downlink packet comprises an indication of an allocation of one or more sub-carriers to each of the triggered first wireless communication devices for the OFDMA based uplink transmission, the allocated sub-carriers for OFDMA and the primary channel for CSMA/CA being non-overlapping, wherein the controller is further adapted to cause the access point to:

receive the OFDMA based uplink transmission from the triggered first wireless communication devices; and receive a CSMA/CA based uplink transmission from one of the second wireless communication devices, wherein the CSMA/CA based uplink transmission and the OFDMA based uplink transmission at least partly overlap in time, wherein, if an end of the CSMA/CA based uplink transmission is later than an end of the OFDMA based uplink transmission, the controller is further adapted to cause the access point to:

delay transmission of an acknowledgement message associated with the OFDMA based uplink transmission until after the end of the CSMA/CA based uplink transmission.

14. The arrangement of claim 13, further comprising a transmitter adapted to transmit the downlink packet.

15. The arrangement of claim 13, wherein a percentage of the bandwidth used as allocated sub-carriers for OFDMA is based on a ratio of a number of first wireless communication devices associated with the access point to a sum of the number of first wireless communication devices associated with the access point and a number of second wireless communication devices associated with the access point.

16. The arrangement of claim 13, wherein a percentage of the bandwidth used as allocated sub-carriers for OFDMA is based on a ratio of a traffic need for communication between the access point and the one or more first wireless communication devices to a total traffic need for communication between the access point and the first and second wireless communication devices.

17. The arrangement of claim 13, wherein the controller is further adapted to cause a time duration between an end of the downlink packet and a start of the OFDMA based uplink transmission to be smaller than a time period threshold, wherein the time period threshold is smaller than or equal to a minimum time period required for any of the second wireless communication devices to acquire access to communication with the access point using CSMA/CA.

18. The arrangement of claim 13, further comprising a receiver adapted to receive the OFDMA based uplink transmission and the CSMA/CA based uplink transmission.

19. The arrangement of claim 13, wherein, if an end of the OFDMA based uplink transmission is later than an end of the CSMA/CA based uplink transmission and an acknowledgement message associated with the CSMA/CA based uplink transmission is due before the end of the OFDMA based uplink transmission, the controller is further adapted to cause the access point to:

transmit the acknowledgement message associated with the CSMA/CA based uplink transmission; and refrain from transmission of the acknowledgement message associated with the CSMA/CA based uplink transmission.

20. The arrangement of claim 19 wherein the controller is further adapted to:

determine a first amount of data of the OFDMA based uplink transmission that will be corrupted by transmission of the acknowledgement message associated with the CSMA/CA based uplink transmission;

determine a second amount of data of the CSMA/CA based uplink transmission to be acknowledged by the acknowledgement message associated with the CSMA/CA based uplink transmission; and select, based on the first and second amounts, whether to cause the access point to transmit the acknowledgement message associated with the CSMA/CA based uplink transmission or to refrain from transmission of the acknowledgement message associated with the CSMA/CA based uplink transmission.

21. The arrangement of claim 13, wherein the communication using OFDMA is compliant with the IEEE 802.11ax standard and the communication using CSMA/CA is compliant with any of the following standards: IEEE 802.11a, IEEE 802.11g, IEEE 802.11n and IEEE 802.11ac.

22. An access point comprising the arrangement according to claim 13.

23. An arrangement for an access point of a wireless communication network, wherein the access point is adapted to use a communication channel resource to communicate with a plurality of first wireless communication devices using orthogonal frequency division multiple access—OFDMA—and to communicate with a plurality of second wireless communication devices using carrier sense multiple access with collision avoidance—CSMA/CA, wherein the communication channel resource comprises a bandwidth of frequencies, the bandwidth of frequencies being dividable into a plurality of sub-carriers for OFDMA and part of the bandwidth of frequencies forming a primary channel for CSMA/CA, the arrangement comprising a controller adapted to cause the access point to:

transmit a downlink packet over all frequencies of the bandwidth for triggering one or more of the first wireless communication devices to perform OFDMA based uplink transmission, wherein the downlink packet comprises an indication of an allocation of one or more sub-carriers to each of the triggered first wireless communication devices for the OFDMA based uplink transmission, the allocated sub-carriers for OFDMA and the primary channel for CSMA/CA being non-overlapping, wherein the controller is further adapted to cause the access point to:

receive the OFDMA based uplink transmission from the triggered first wireless communication devices; and receive a CSMA/CA based uplink transmission from one of the second wireless communication devices, wherein the CSMA/CA based uplink transmission and the OFDMA based uplink transmission at least partly overlap in time, wherein, if an end of the CSMA/CA based uplink transmission is later than an end of the OFDMA based uplink transmission, the controller is further adapted to cause the access point to:

delay transmission of an acknowledgement message associated with the OFDMA based uplink transmission until after the end of the CSMA/CA based uplink transmission provided that a time interval between the end of the OFDMA based uplink transmission and the end of the CSMA/CA based uplink transmission is smaller than a maximum time interval.

24. The arrangement of claim 23 wherein the controller is further adapted to cause the access point to transmit a value of the maximum time interval to one or more of the first wireless communication devices.

* * * * *